United States Patent [19]

Nozaki

[11] Patent Number: 4,998,946
[45] Date of Patent: Mar. 12, 1991

[54] WEATHER STRIP FOR MOTOR VEHICLE
[75] Inventor: Masahiro Nozaki, Miwa, Japan
[73] Assignee: Toyoda Gosei Co., Ltd., Nishikasugai, Japan
[21] Appl. No.: 529,550
[22] Filed: May 29, 1990
[30] Foreign Application Priority Data Aug. 18, 1989 [JP] Japan .................................. 1-97063

[51] Int. Cl.⁵ .............................................. E06B 7/16
[52] U.S. Cl. ........................................ 49/497; 49/498
[58] Field of Search ................. 49/475, 485, 496–498, 49/490, 491

[56] References Cited

U.S. PATENT DOCUMENTS 3,452,481  7/1969  Bailey .................................... 49/485
3,922,460  11/1975  Jackson ............................. 49/491 X
4,513,044  4/1985  Shigeki et al. ..................... 49/498 X
4,827,670  5/1989  Kogiso et al. .......................... 49/476

FOREIGN PATENT DOCUMENTS 83005  6/1957  Denmark .
63-37365  3/1988  Japan .

Primary Examiner—Gary L. Smith
Assistant Examiner—Jerry Redman
Attorney, Agent, or Firm—Cushman, Darby & Cushman

[57] ABSTRACT

A weather strip to be attached along a door opening of a body of a motor vehicle has a base portion and a tubular sealing portion projecting from an outer surface of the base portion. The tubular sealing portion has a folded end portion which is formed by pressing so as to bond and close an end of the tubular sealing portion. The folded end portion has a nearly L-shaped cross section, and is composed of a bonded portion which covers the base portion, and an extension portion which nearly perpendicularly extends from one of side ends of the bonding portion. The side surface of the extension portion is a prolongation of the side surface of the unfolded tubular sealing portion, which faces the body surface of the motor vehicle when the weather strip is attached to the motor vehicle. The width of the sealing portion is nearly equal over the entire length thereof from its unfolded tubular portion to its folded end portion so that the sealing portion is naturally continued from its unfolded tubular portion to its folded end portion without any sudden change in shape whereby the appearance of the overall weather strip is improved.

6 Claims, 4 Drawing Sheets

WEATHER STRIP FOR MOTOR VEHICLE

BACKGROUND OF THE INVENTION

1. Field of the Invention

The present invention relates to a weather strip to be attached along one of an edge of a door opening and a periphery of a door of a motor vehicle.

2. Description of the Prior Art

The weather strip of this type is generally composed of a base portion to be attached along one of an edge of a door opening and a periphery of a door, and a tubular sealing portion projecting from the base portion to come into contact with an opposing member for effecting a seal.

In some type of motor vehicle, the tubular sealing portion of the weather strip is not formed over the entire length thereof, but formed only in a predetermined portion thereof. In a motor vehicle having frameless doors, the weather strip attached to a flange formed along the door opening has a sealing portion in its lower half portion to come into contact with a periphery of a door panel, but no sealing portion in its upper half portion to come into contact with a periphery of a door glass. In this weather strip, the base portion of its upper half portion acts as a trim covering the flange, and another weather strip for sealing the periphery of the door glass is attached along the trim. In the above described weather strip, ends of the sealing portion are open, and accordingly, the appearance of the weather strip is not fine. In order to solve this problem, the ends of the sealing portion have been pressed thereby closing them. (Japanese Unexamined Utility Model Publication No. Sho 63-37365).

FIGS. 8 and 9 illustrate an end portion of a tubular sealing portion 12 of a conventional weather strip 1'. A base portion 11 of the weather strip 1' is mounted on a flange 41 of a center pillar 4, and an end of the tubular sealing portion 12 which is located at a position corresponding to a door belt line is pressed into a folded shape thereby obtaining a folded end portion 13.

Due to the pressing work, the widthness of the folded end portion 13 is greater than that of the base portion 11 whereby the appearance of the folded end portion 13 is deteriorated. When the base portion 11 is mounted on the flange 41, the folded end portion 13 undesirably abuts on a panel 42 of the center pillar 4, and accordingly, the base portion 11 cannot be fitted onto the flange 41. In consideration of the above problem, the pressing work has been carried out so that the width of the obtained folded end portion 13 is nearly equal to that of the base portion 11. To this end, notches 15, for example, have been formed in the end portion of the sealing portion 12 in a widthwise opposing relationship as shown in FIG. 10, and then the end portion has been pressed into a folded shape. However, in this method, the sealing portion 12 suddenly changes in both height and width from its unfolded portion to its folded end portion, and a space 5 is formed between the sealing portion 12 and the opposing panel 42 of the center pillar 4 so that the folded end portion 13 is irregular with respect to the unfolded tubular portion, and accordingly, the fine appearance of the weather strip is not maintained.

SUMMARY OF THE INVENTION

It is an object of the present invention to provide a weather strip of which a folded end portion of a tubular sealing portion is naturally continued to its unfolded tubular portion to give the folded end portion a fine appearance.

In accordance with the present invention, the weather strip which is to be attached along one of a door opening of a body of a motor vehicle and a periphery of a door which closes the door opening, has a base portion and a tubular sealing portion projecting from an outer surface of the base portion. The tubular sealing portion has a folded end portion which is formed by pressing so as to bond and close an end of the tubular sealing portion. The folded end portion has a nearly L-shaped cross section, and is composed of a bonded portion which covers the base portion, and an extension portion which nearly perpendicularly extends from one of widthwise ends of the bonded portion.

The side surface of the extension portion is a prolongation of the side surface of the unfolded tubular sealing portion, which faces one of the body surface of the motor vehicle and the periphery of the door when the weather strip is attached to the motor vehicle.

The width of the sealing portion is nearly equal over the entire length thereof from its unfolded tubular portion to its folded end portion so that the sealing portion is naturally continued from its unfolded tubular portion to its folded end portion without any sudden change in shape. This results in the folded end portion being free from the irregularity with respect to the unfolded tubular portion thereby improving the appearance of the overall weather strip.

DETAILED DESCRIPTION OF THE EMBODIMENTS

Figure 1:
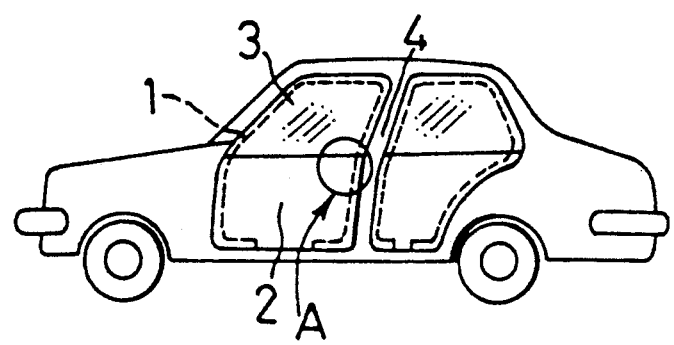
FIG. 1 is a side view of a motor vehicle wherein a first embodiment of a weather strip in accordance with the present invention is attached to a door opening.
Figure 2:
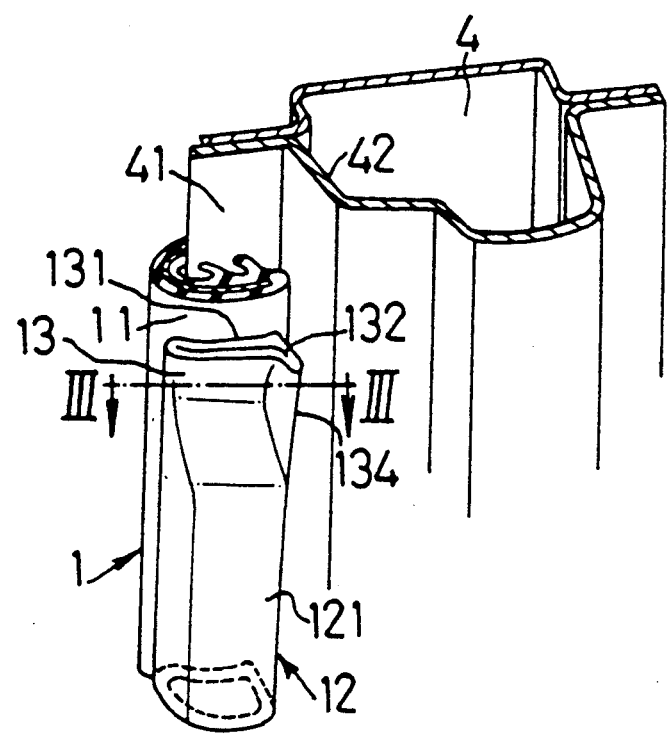
FIG. 2 is a perspective view, partially in section, of the weather strip at the position encircled by a circle A in FIG. 1.
Figure 3:
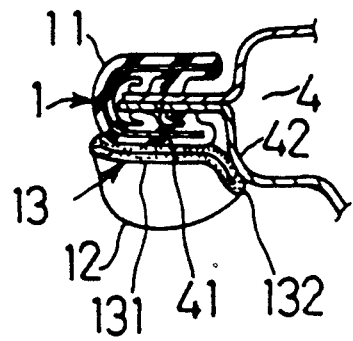
FIG. 3 is a cross-sectional view taken along the line III—III of FIG. 2.

Referring to FIG. 1, a weather strip 1 is continuously attached to an edge of a door opening of a motor vehicle. FIG. 2 is a perspective view, partially in section, of the weather strip 1 attached to a center pillar 4, at a position encircled by a circle A in FIG. 1. As shown in FIG. 2, the weather strip 1 is composed of a base portion 11 having a U-shaped cross section, and a tubular sealing portion 12 projecting from one side surface of the base portion 11. The base portion 11 is mounted on a flange 41 formed over the entire length of a door opening, which is partially defined by the center pillar 4. The tubular sealing portion 12 is provided only in the lower half portion of the base portion 11 which takes a ringlike shape along the door opening, and comes into contact with the periphery of a panel of a door 2 when the door 2 is closed.

The base portion 11 is made of solid rubber while the tubular sealing portion 12 is made of sponge rubber. They are formed by extruding, respectively, and then, the tubular sealing portion 12 is bonded to one side surface of the base portion 11.

As shown in FIG. 2, an end portion of the tubular sealing portion 12 is pressed into a folded shape to close an end thereof. The pressing work is carried out, for example, by heating the end of the tubular sealing portion 12 and pressing it into a plate-shape having an L-shaped cross section by means of a die whereby opposed surfaces of the pressed end of the tubular sealing portion 12 are bonded to each other.

An obtained folded end portion 13 of the sealing portion 12 has a predetermined length from an end of the sealing portion 12 in a longitudinal direction thereof, and is composed of a bonded portion 131 having a width nearly equal to that of the one side surface of the base portion 11, to which the tubular sealing portion 12 is bonded, and an extension portion 132 which nearly perpendicularly extends from the bonded portion 131 along a panel 42 of the center pillar 4. The side surface of the extension portion 132 is a prolongation of the side surface of an unfolded tubular portion 121, which faces the panel 42. The overall width of the folded end portion 13 is nearly equal to that of the unfolded tubular portion 121, and the height of the extension portion 132 is nearly equal to that of the side surface of the unfolded tubular portion 121. And an edge 134 of the extension portion 132 forms a straight line with the unfolded tubular portion 121. The folded end portion 13 is continued to the unfolded tubular portion 121 through an inclined portion having a height gradually increasing from the folded end portion 13 to the unfolded tubular portion 121. This results in the thus formed tubular sealing portion 12 naturally continuing from the folded end portion 13 to the unfolded tubular portion 121, and being in intimate contact with the panel 42 over the entire length thereof. Accordingly, the appearance of the weather strip is improved without any sudden change in shape.

Figure 4:
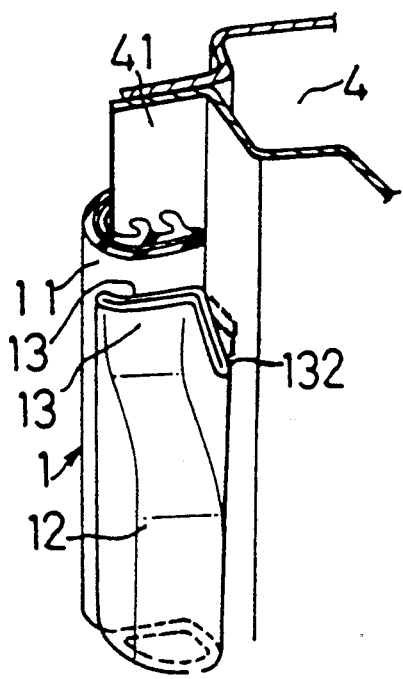
FIG. 4 is a perspective view, partially in section, of a modification of the weather strip shown in FIG. 2.

When the extension portion 132 of the folded end portion 13 is of a large height or width as shown in FIG. 4, an end of the extension portion 132 is cut obliquely downwards to form an inclined surface. By cutting in this way, the appearance of the extension portion 132 is improved.

The present invention is also applicable to the weather strip for a periphery of a door.

Figure 5:
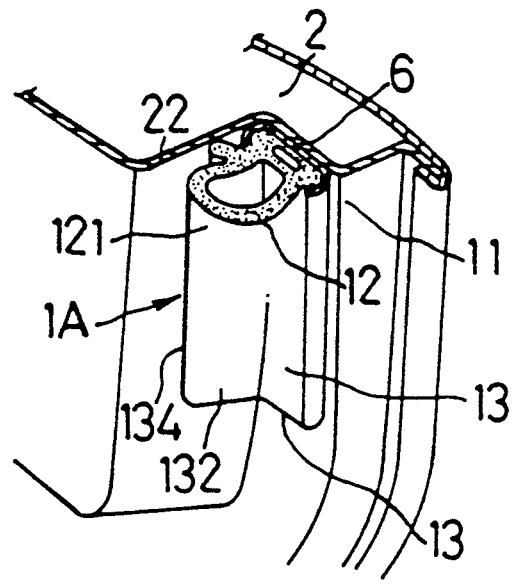
FIG. 5 is a perspective view, partially in section, of a lower end portion of a second embodiment of the weather strip in accordance with the present invention, which is attached to a door.
Figure 6:
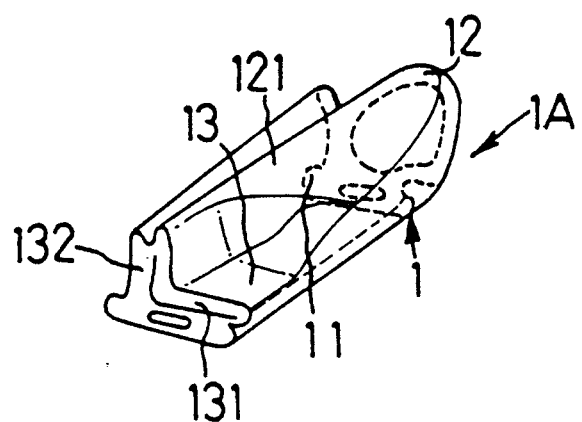
FIG. 6 is a perspective view, partially in section, of a folded end portion of the weather strip of FIG. 5.

As shown in FIG. 5, an inner panel 22 of a door panel 2 has nearly perpendicularly intersecting two surfaces forming an L-shaped cross section with each other along a periphery thereof. An extruded weather strip 1A made of sponge rubber is attached to one of the above two surfaces through a retainer 6. The weather strip 1A has a thick-walled and strip-shaped base portion 11 and a tubular sealing portion 12 which are integrally formed by extrusion. A lower end of the weather strip 1A is pressed into a folded shape so that the opposed surfaces thereof are bonded to each other thereby closing the tubular sealing portion. An obtained folded end portion 13 has an L-shaped cross section, and is composed of a bonded portion 131 which covers the base portion 11, and an extension portion 132 which nearly perpendicularly extends from one end of the bonded portion 131 along the other surface of the inner panel 22, and an edge 134 of the extension portion 132 is continued to the unfolded tubular portion 121 in a straight line.

This weather strip 1A naturally continues over the entire length thereof from one end to the other end, and accordingly the appearance thereof is improved without any sudden change in shape.

Figure 7:
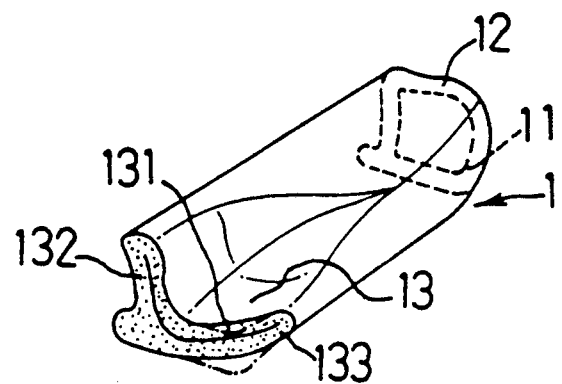
FIG. 7 is a perspective view, partially in section, of a modification of the folded end portion shown in FIG. 6.
Figure 8:
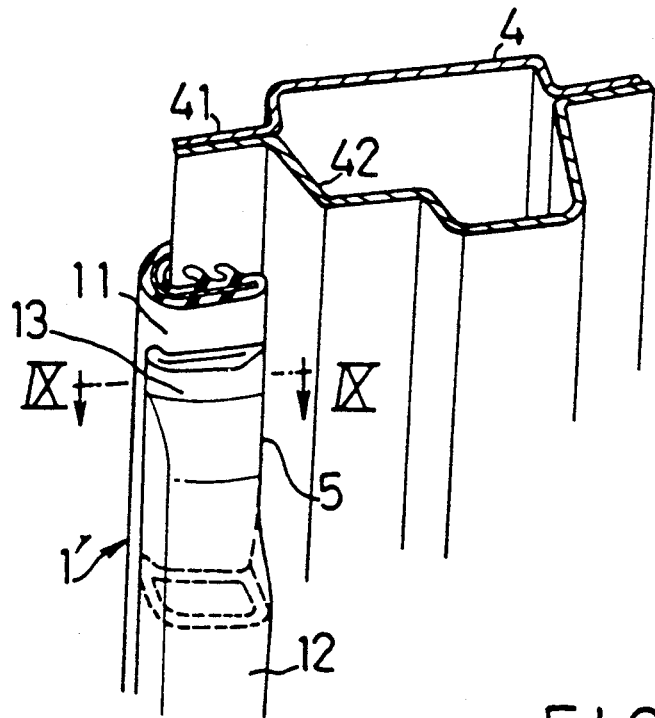
FIG. 8 is a perspective view, partially in section, of a conventional weather strip at the position corresponding to that of FIG. 2.
Figure 9:
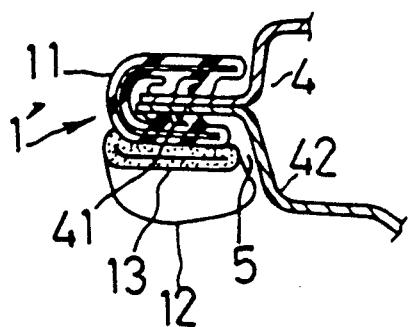
FIG. 9 is a cross-sectional view taken along the line IX—IX of FIG. 8.
Figure 10:
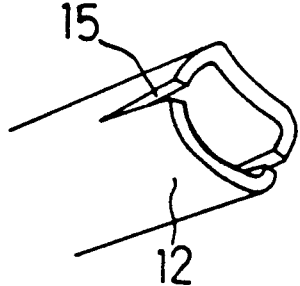
FIG. 10 is a view illustrating the state of the conventional weather strip before the sealing portion is pressed.

Furthermore, as shown in FIG. 7, by cutting off a corner 133 of the folded end portion 13 in a curved line, the appearance of the end of the weather strip is further improved.

What is claimed is:

1. A weather strip made of rubber or synthetic resin, which is to be attached along one of a door opening of a body of a motor vehicle and a periphery of a door for closing the door opening, comprising:
    a base portion;
    a tubular sealing portion projecting from an outer surface of said base portion;
    said tubular sealing portion having a folded end portion which is formed by pressing so as to close an end of said tubular sealing portion;
    said folded end portion having a nearly L-shaped cross section, and is composed of a bonded portion which covers said outer surface of said base portion, and an extension portion which nearly perpendicularly extends from one of widthwise ends of said bonded portion along one of the body of the motor vehicle and a panel of the door, said extension portion extends away from the base portion, a side surface of said extension portion being a prolongation of a side surface of said tubular sealing portion, which is opposed to one of the body of the motor vehicle and the panel of the door.

2. A weather strip according to claim 1 wherein said folded end portion has a predetermined length from an end of said sealing portion in a longitudinal direction of said sealing portion, said folded end portion is continued to an unfolded tubular portion through an inclined portion having a height gradually increasing from said folded end portion to said unfolded tubular portion, and an edge of said extension portion is continued to said unfolded tubular sealing portion in a straight line.

3. A weather strip according to claim 2, wherein said base portion has a U-shaped cross section, and is mounted on a flange formed over the entire length of a door opening of a body of a motor vehicle, which is partially defined by a center pillar, said tubular sealing portion is formed on one side surface of said base portion, which is opposed to a periphery of the door, folded end portion of said tubular sealing portion is located at a position corresponding to a door belt line, said bonded portion of said folded end portion has a width nearly equal to that of said side surface of said base portion so as to cover said side surface, and said extension portion is in contact with a panel of the center pillar.

4. A weather strip according to claim 3, wherein said base portion is made of solid rubber, and said tubular sealing portion is made of sponge rubber.

5. A weather strip according to claim 2, wherein said base portion is a thick-walled and strip-shaped body, and is attached to a periphery of an inner panel of a door panel through a retainer, said tubular sealing portion is formed over the entire length of said base portion, said folded end portion is formed in a lower end portion of said tubular sealing portion, said bonded portion has a width nearly equal to that of said base portion so as to cover one side surface of said base portion, and said extension portion is in contact with the inner panel.

6. A weather strip according to claim 5, wherein each of said base portion and said tubular sealing portion is made of sponge rubber.

* * * * *